US005561569A

United States Patent [19]
Chiou et al.

[11] Patent Number: 5,561,569
[45] Date of Patent: Oct. 1, 1996

[54] STRUCTURE FOR TAPE DRIVING DEVICE

[75] Inventors: Yee-Haur Chiou, Hsinchu; Jyh-Jong Ju, Taoyuang, both of Taiwan

[73] Assignee: Industrial Technology Research Institute, Hsinchu Hsien, Taiwan

[21] Appl. No.: 355,734

[22] Filed: Dec. 14, 1994

[51] Int. Cl.$^6$ ................................................. G11B 15/32
[52] U.S. Cl. ............................................. 360/96.3; 360/93
[58] Field of Search ........................... 360/90, 96.1, 96.3, 360/96.4, 93

[56] References Cited

U.S. PATENT DOCUMENTS

| | | | |
|---|---|---|---|
| 4,438,879 | 3/1984 | Rudi | 226/188 |
| 4,922,357 | 5/1990 | Komatsu et al. | 360/105 |
| 4,931,890 | 6/1990 | Cousino | 360/93 |
| 5,029,028 | 7/1991 | Kumatsu et al. | 360/105 |
| 5,210,664 | 5/1993 | Perona | 360/93 |

*Primary Examiner*—Stuart S. Levy
*Assistant Examiner*—William J. Klimowicz
*Attorney, Agent, or Firm*—W. Wayne Liauh

[57] ABSTRACT

An improved structure for use in a tape driving device for driving a tape contained in a cartridge. The improved structure comprises (a) a first slide plate having a plurality of first slideways received by first horizontal grooves, so as to allow the first slide plate to reciprocate on vertical guide pins, the first slide plate being slidable in a direction parallel to the direction in which a cartridge is inserted; (b) a second slide plate having a plurality of second slideways received by second horizontal grooves so as to allow the second slide plate to reciprocate on the vertical guide pins, the second slide plate being slidable in a direction parallel to the direction in which the cartridge is inserted; (c) a main driving wheel and a motor mounted on the first slide plate; (d) an idle wheel mounted on the second plate; and (e) a spring connecting between the first slide plate and the base plate; (f) wherein the idle wheel, the main driving wheel, and the spring are positioned such that when the cartridge is inserted into the slot, the spring will be tensiled thus causing the main driving wheel to be in contact with the idle wheel, and the idle wheel in contact with a driving wheel provided in the cartridge, whereby a frictional force between the idle wheel and the driving wheel will cause a tape traveling therebetween to move as a result of a rotation by the main driving wheel.

4 Claims, 6 Drawing Sheets

STRUCTURE FOR TAPE DRIVING DEVICE

BACKGROUND OF THE INVENTION

This invention relates to an improved structure for tape driving device, and particularly to an improved structure that uses idle wheel for driving the drive wheel in the cassette for leading tape driving device to motion.

The way of driving often used by the conventional tape driving device for being driven by the frictional force of drive wheel may include: (1) flat belt transmission (2) toothed belt transmission (3) motor direct drive (4) idle wheel drive.

Wherein flat belt transmission of drive wheel has advantage for simple structure, cheap cost but it is not an ideal way of drive because easy slip of belt will cause idle run. Though the way of drive by toothed belt may solve said problem of drive by flat belt, however it has to adopt toothed belt and belt wheel of special specification to increase the cost.

Though motor direct transmission of drive wheel is cheap cost and reliable for transmission, however owing to a large size of motor it is quite difficult for mounting motor close to drive wheel and it therefore causes the problem of space arrangement for cassette tape unit, further its dimensions are bigger than said ways of transmission.

Referring to idle wheel drive, it relates to idle wheel added between power output wheel of motor and tape drive wheel so it may achieve reliable transmission and cheap cost by direct transmission, and it also solves the problem of space arrangement found in direct transmission. Nevertheless, the structure for mounting members of transmission mechanism for idle wheel transmission, e.g. idle wheel, drive wheel and motor is quite complicated and difficult for assembly and therefore causes the problem of maintenance.

SUMMARY OF THE INVENTION

One object of the invention is to provide an improved structure for tape driving device with simple structure and reliable transmission.

Another object of the invention is to provide an improved structure for tape driving device that is highly modular and easy for maintenance.

Still another object of the invention is to provide an improved structure for tape driving device that is cheap cost and space saving.

These and other objects and advantages of the present invention will become apparent to those skilled in art after considering the following detailed specification together with the accompanying drawings.

DETAILED DESCRIPTION OF PREFERRED EMBODIMENT

Figure 1:
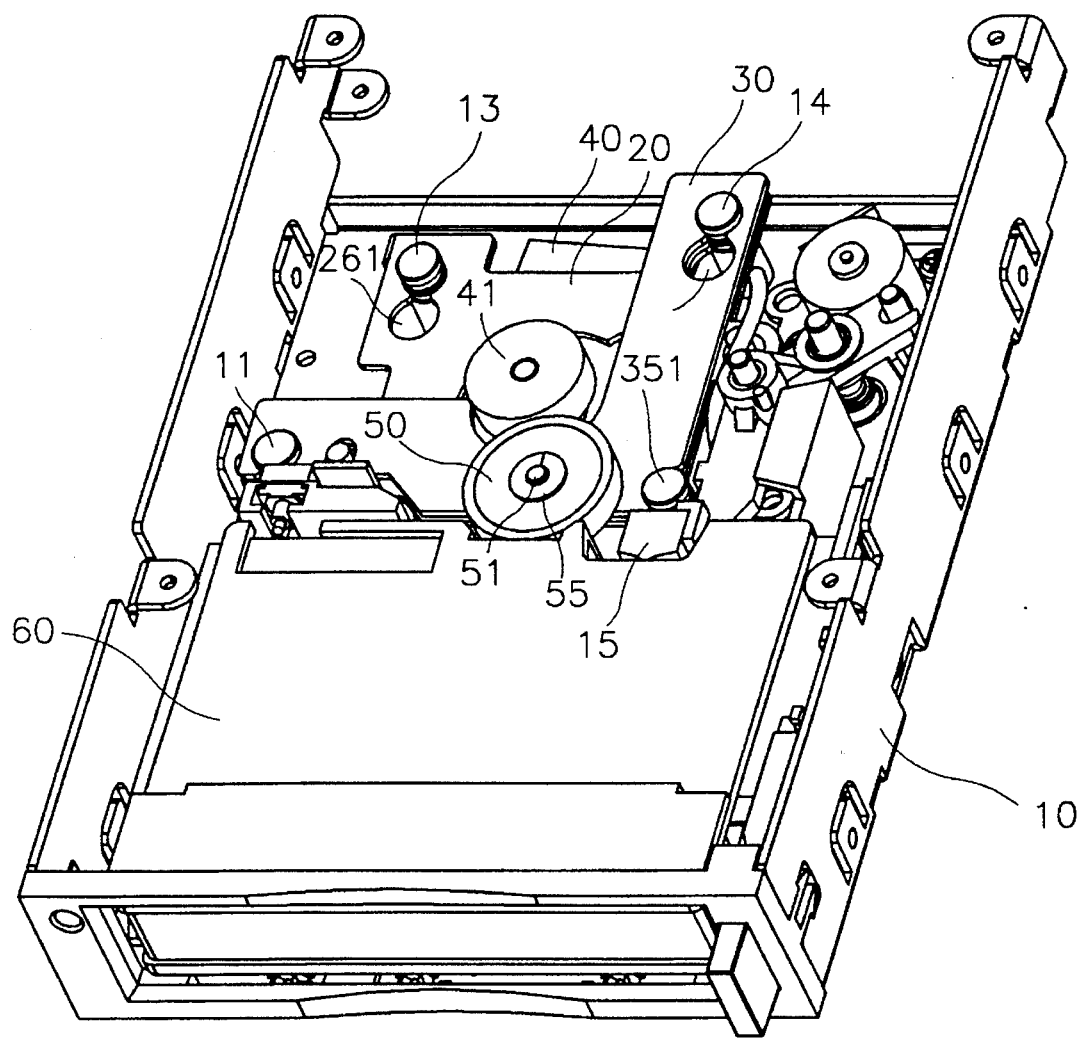
FIG. 1 is an elevational-assembly view of the invention.
Figure 2:
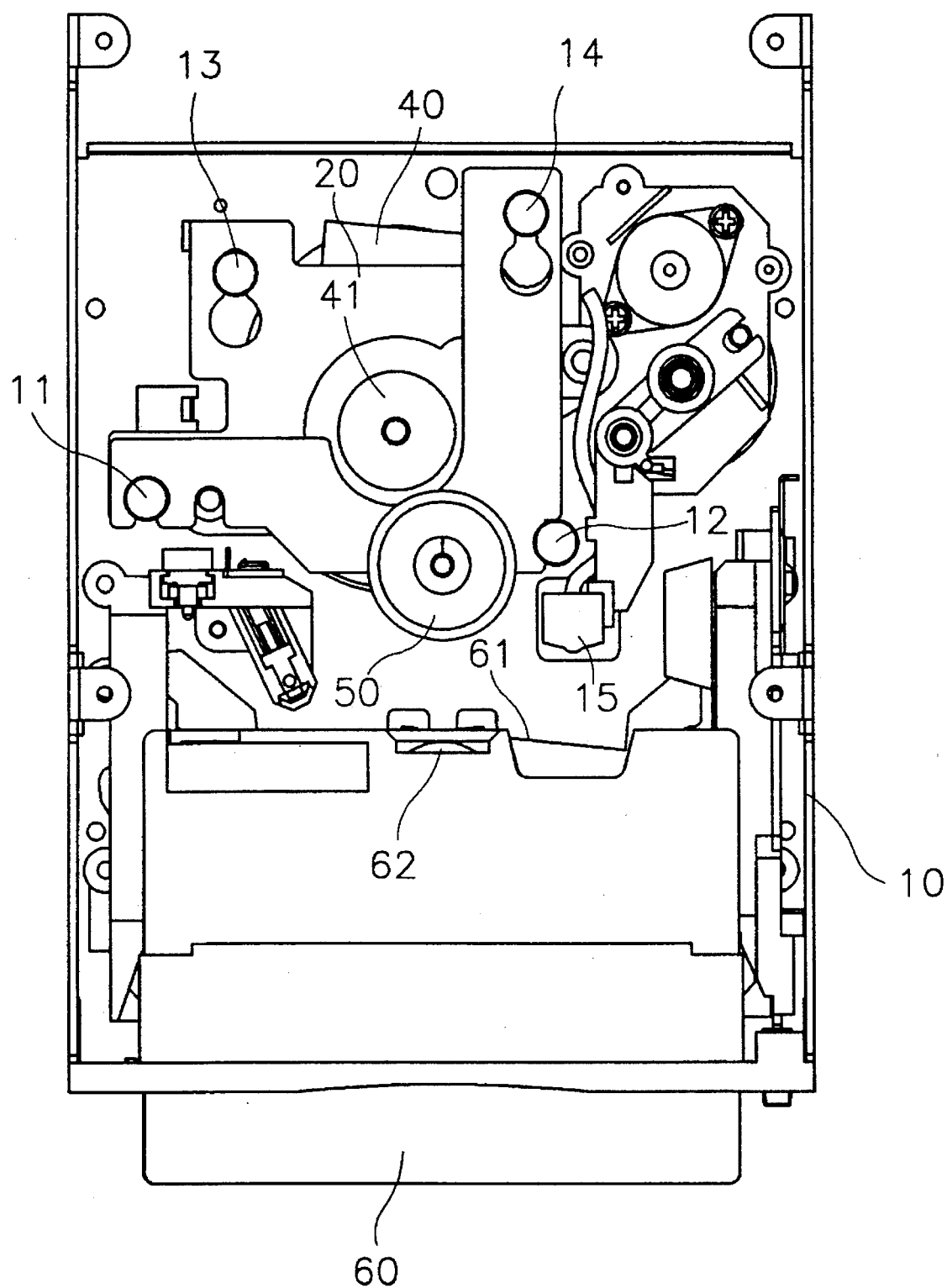
FIG. 2 is a top view showing the driving device of the invention not yet inserted in the cassette or retreated from the cassette.
Figure 3:
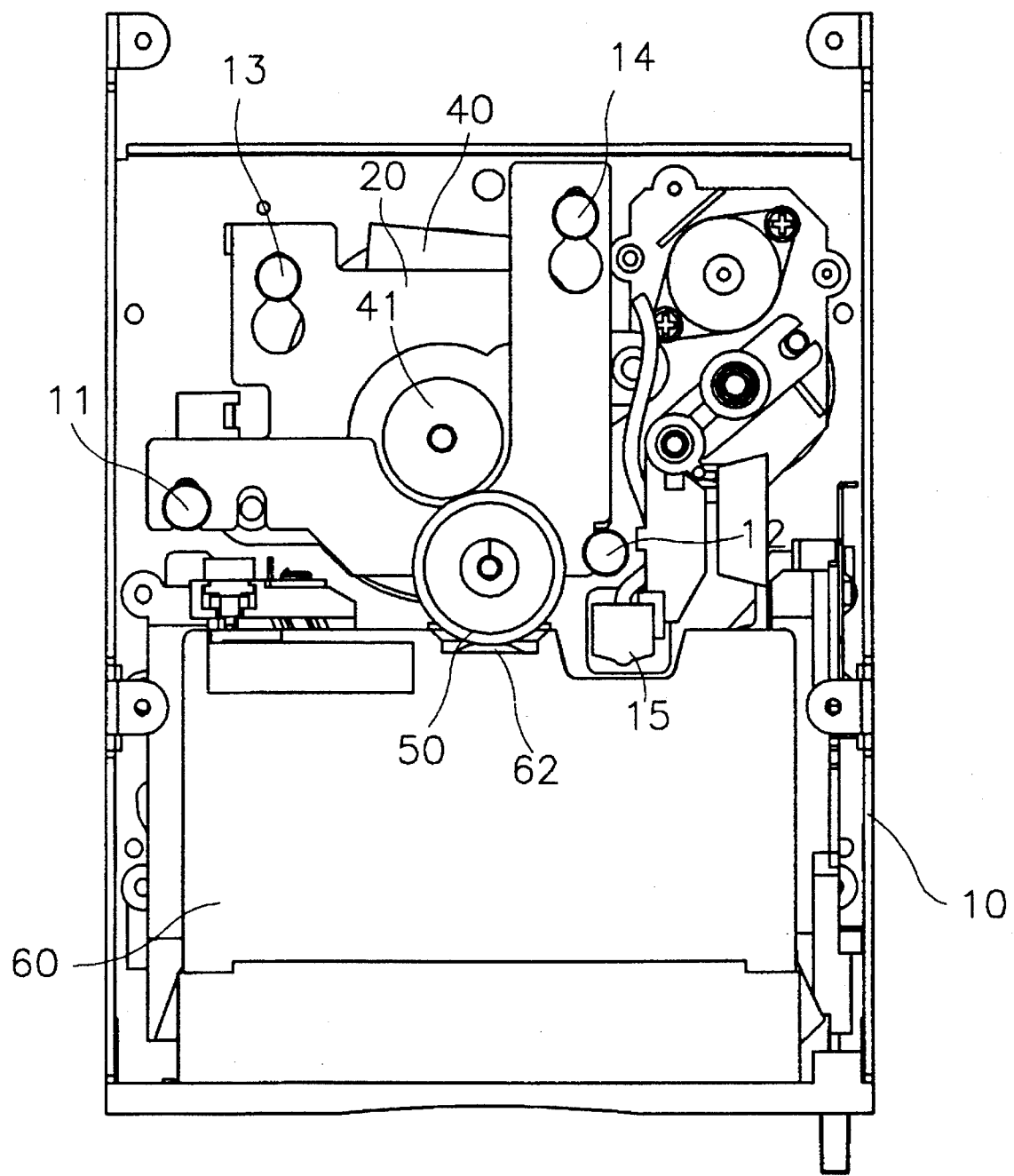
FIG. 3 is a top view showing the driving device of the invention inserted in position within the cassette.

Referring to FIGS. 1, 2 and 3, the invention relates to use guide pins 11, 12, 13 for mounting two slide plates 20, 30 on tape unit 10, and mounting motor 40 and main driving wheel 41 on said slide plate 20, and an idle wheel 50 on said slide plate 30. When the cassette 60 is inserted in position along the slot of the tape unit 10, said idle wheel 50 may contact with the drive wheel 62 and main driving wheel 41 of the cassette 60 and proper holding force will be kept due to spring pressure. Wherein said cassette 60 has a drive wheel 62 to contact with said idle wheel 50 and to be driven by said idle wheel 50 in rotation and further to lead the tape 61 passing by magnetic head 15 (FIG. 3) of tape unit. When said cassette 60 is ejected from said tape unit 10, said idle wheel 50 and main driving wheel 41 will be disengaged (FIG. 2) to prevent idle wheel 50 from damage due to permanent pressure.

Figure 4:
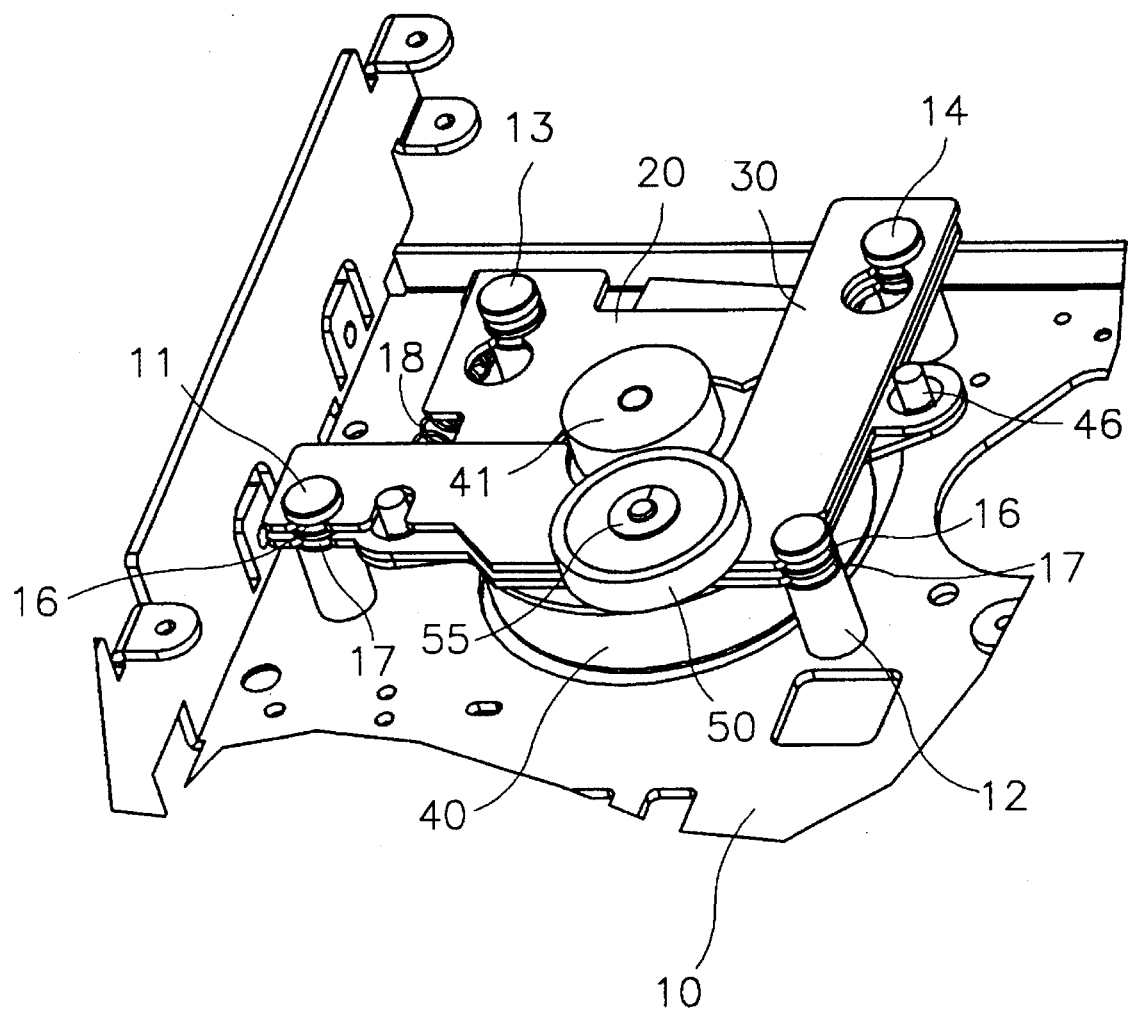
FIG. 4 is a partially-enlarged elevational view of driving device of the invention.

Referring to FIG. 4, the motor 40 and main driving wheel 41 of the invention are mounted on the slide plate 20 while the idle wheel 50 is mounted on the slide plate 30, said two slide plates 20, 30 are mounted on said tape unit 10 by means of four guide pins 11, 12, 13 and 14. Each guide pin has upper and lower annular slots 16, 17, said annular slots 16, 17 are little wider than the thickness of slide plates 20, 30 so that said slide plates 20, 30 can be slidably set within said annular slots 16, 17.

Figure 5:
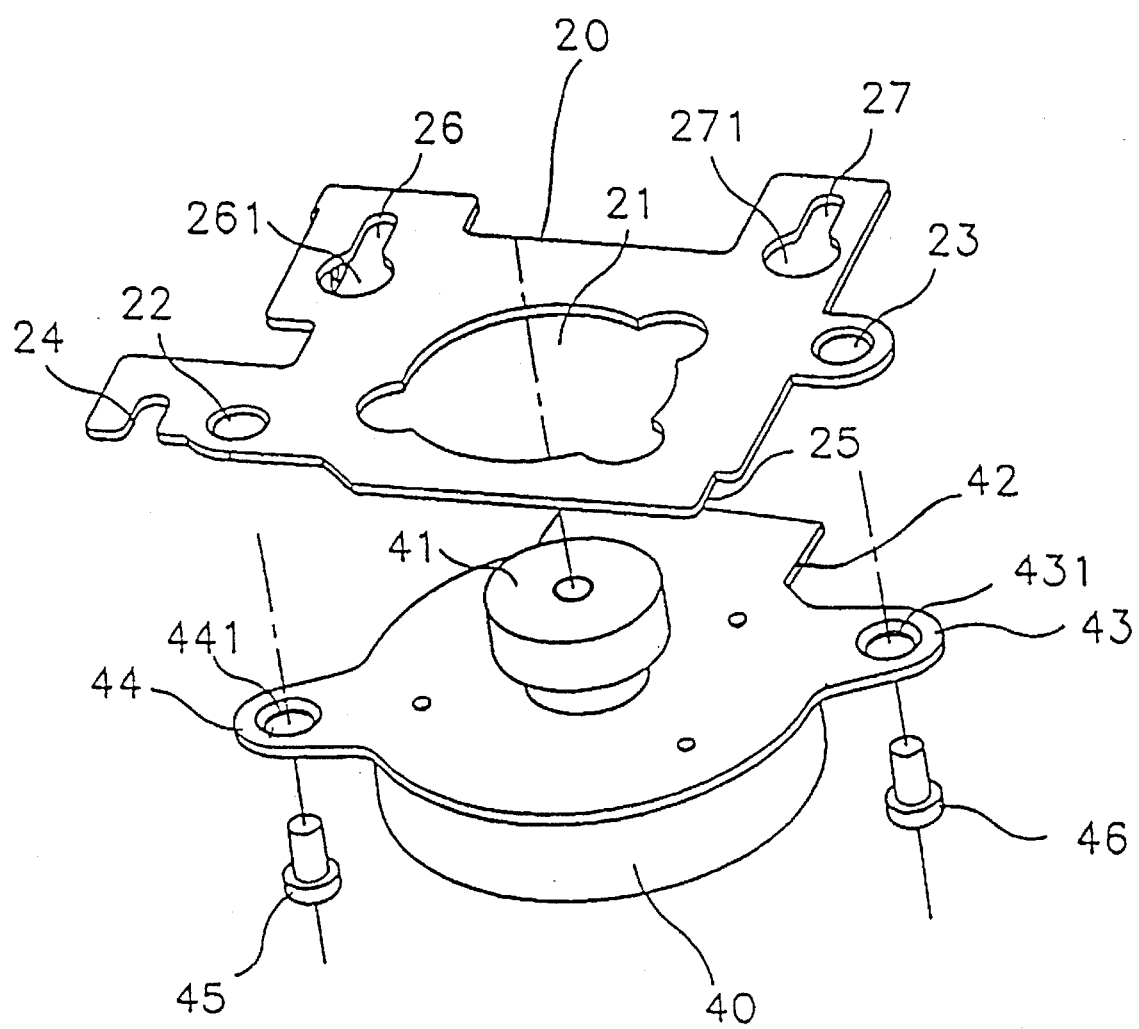
FIG. 5 is an elevational-exploded view of motor and drive wheel, and slide plate for mounting said motor and drive wheel.

Referring to FIG. 5, said motor 40 is securely mounted under said slide plate 20 by means of screws 45, 46. The center of said slide plate 20 has a hole 21 for the main driving wheel 41 on the mandrel of said motor 40 to extend through above said slide plate 20. The side contacted between said motor 40 and slide plate 20 has a fixing plate 42, and each side of said fixing plate 42 has a flange 43, 44, and on said flanges 43, 44 have thread holes 431, 441, and on said slide plate 20 has thread holes 22, 23 relatively to said thread holes 431, 441. Then two screws 45, 46 extend through said thread holes 431, 441 and lock into said thread holes 22, 23 to lock fixing plate 42 under said slide plate 20 and therefore to fix said motor 40 and main driving wheel 41 on said slide plate 20.

On said slide plate 20 has four slideways 24, 25, 26, 27 parallel to the direction of said cassette 60 inserted in the tape unit 10. The position of each said slideway is corresponding to the position of said guide pins 11, 12, 13, 14 respectively, and the width lies between bottom diameter of annular slot 17 under each said guide pin and outside diameter of guide pins 11, 12, 13, 14 so that it may be slidably set within said annular slot 17. Meanwhile the leading end of slideways 24, 25 in front of said slide plate 20 appears an opening while slideways 26, 27 on the rear end have a cut diameter greater than the cut holes 261, 271 on the diameter of said guide pins 13, 14 so that said guide pins 11, 12, 13, 14 may be slidably set within annular slot 17 under each said guide pin from the leading opening of slideways 24, 25, 26, 27, or disengaged with annular slot 17 on each said guide pin.

With the aforesaid structure, said slide plate 20 can be convenient and quick for mounting and dismounting so that it may be slidable parallel to the insertion direction of said cassette 60. In addition, a tensile spring 18 (FIGS. 2, 3 and 4) is connected between the side of said slide plate 20 and the base plate of said unit 10, with tensile force of said spring 18 said slide plate 20 may keep at start dead point position as shown in FIG. 2 while enabling the bottom of said slideways 24, 25, 26 27 to keep contact with guide pins 11, 12, 13, 14 respectively; when said cassette 60 is inserted in position within the unit 10, said idle wheel 50 will be pushed by the drive wheel 62 of said cassette 60 for pushing backward against said main driving wheel 41 so that said main driving wheel 41 may keep steady contact pressure with said idle wheel 50 while enabling said idle wheel 50, tape 61 and drive wheel 62 to keep appropriate holding force.

Figure 6:
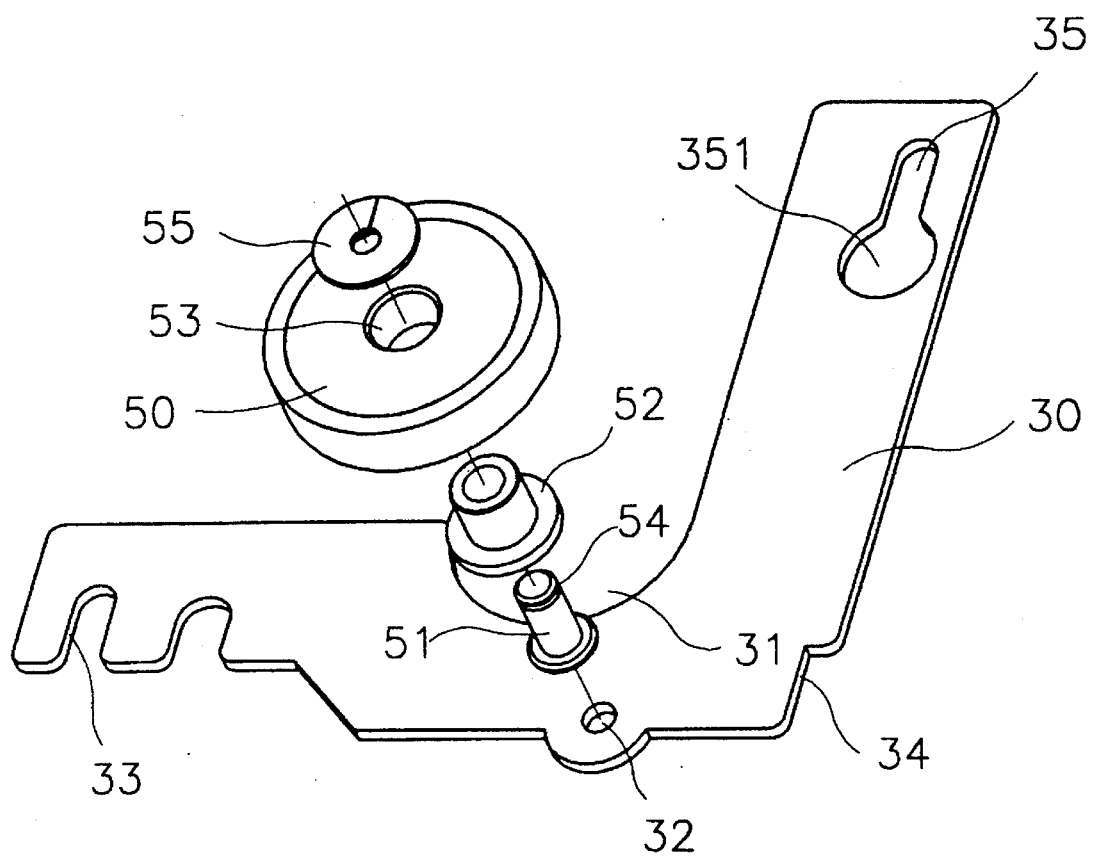
FIG. 6 is an elevational-exploded view of idle wheel and slide plate for mounting said idle wheel.

Referring to FIG. 6, said idle wheel 50 may be slidably mounted on said unit 10 along the insertion direction of said cassette with the help of slide plate 30 parallel overlaying on said slide plate 20. Said slide plate 30 resembles "L" shape and has an arc notch 31 near the position of main driving wheel 41 to get away from said main driving wheel 41.

The leading end of said slide plate 30 close to the drive wheel 62 of said cassette 60 has a hole 32, a shaft pin 51 is vertical to said slide plate 30 and extending upwardly into said hole 32, on said shaft pin 51 has a bearing 52 mounted thereon, said bearing 52 may match the shaft hole 53 in the center f said idle wheel 50 while enabling said idle wheel or bearing to turn around said shaft pin 51 for mounting thereon. When said shaft pin 51 is mounted together with bearing 52 and idle wheel 50, its distal end is slightly projecting over said idle wheel 50, and on said projecting portion has a groove 54, said groove 54 further retains together with an elastic check ring 55 so that said idle wheel 50 can be fixed on shaft pin 51.

The leading end of said slide plate 30 corresponding to the position of slideways 24, 25 on the leading end of slide plate 20 has two slideways 33, 34 with identical position and width to said slideways 24, 25, and the rear end corresponding to the position of slideway 27 of said slide plate 20 has a slideway 35, and on the leading end opening of said slideway 32 has a hole 351. The front opening of said slideways 33, 34 and the position of said hole 351 are to match the position of guide pins 11, 12, 13 on said unit, and the width of said slide plate may match annular slot 16 on the upper end of said guide pins 11, 12, 14 so that said slide plate 30 can be convenient and quick for mounting together with said slide plate 20 on said guide pins 11, 12, 14, and is restricted by annular slot 16 of each said guide pin for reciprocating sliding along said slideways 33, 34, 35.

Said slide plate 30 and said slide plate 20 may be reciprocally sliding relatively so that said idle wheel 50 and said main driving wheel 41 can produce relative displacement.

Referring to FIG. 3, to enable said idle wheel 50 to disengage with said main driving wheel 41 when ejecting from the cassette 60, slide stroke of said slide plate 30 is designed as slightly larger than slide stroke of said slide plate 20 while enabling it to reach the bottom of slideways 24, 25, 26, 27 for pressing guide pins 11, 12, 13, 14 when said slide plate 20 is pulled downwardly by spring 18 to its start dead point position, the distal end of slideways 33, 34, 35 of said slide plate 30 still has some distance from each said guide pin so that said slide plate 30 may have some extent allowable for reciprocal sliding to enable said idle wheel 50 to disengage with said main driving wheel 41 when ejecting from the cassette 60 so as to prevent said idle wheel 50 from sustaining permanent pressure.

Referring to FIGS. 2 and 3, the drive wheel 62 of said cassette 60 will touch the idle wheel 50 to push it moving backwards when the cassette 60 is inserted in the unit 10. Said main driving wheel 41 will move following the motor 41 when said idle wheel touches said main driving wheel 41. The spring 18 will be tensiled because te slide plate 20 mounting motor 40 and main driving wheel 41 is pushed moving backwards. Tensile force of said spring 18 will force said main driving wheel 41 keep holding onto the idle wheel 50 when cassette 60 is in position as shown in FIG. 3 so that said idle wheel 50 will hold onto the tape 61 and drive wheel 62 at appropriate compression whereby said idle wheel 50 may match said drive wheel 62 for leading said tape 61 in rotation.

Said idle wheel 50 and main driving wheel 41 will become free for reciprocal movement when said cassette 60 ejects from the unit so that said slide plate 20 and slide plate 30 will be brought by spring 18 to the start position (FIG. 2). When said slide plate 20 and slide plate 30 return to start position, because said slide plate 30 still has some extent allowable for reciprocal sliding so that said idle wheel 50 will not sustain pressure to prolong its life span.

With the aforesaid assembly, motor 40, main driving wheel 41 and idle wheel 50 may be mounted on said unit 10 by means of said slide plates 20, 30, when dismounting it is only required for pushing said slide plates 20, 30 backwards enabling each slideway on said slide plates 20, 30, and guide pins 11, 12, 13, 14 on said unit 10 to disengage whereby said motor 40, main driving wheel 41, idle wheel 50 together with slide plates 20, 30 can be dismounted without need of using any tool. Such modular structure is simple and easy for mounting and dismounting so that the driving device of the invention has advantages such as cheap cost, reliable transmission and easy for maintenance.

We claim:

1. An improved structure for use in a tape driving device for driving it tape contained in a cartridge, said improved structure comprising:
(a) a main unit having a base plate and a slot on said main unit for receiving said cartridge;
(b) at least three vertical guide pins mounted on said main unit in a direction vertical to a direction in which said cartridge is inserted into said slot;
(c) first and second horizontal grooves formed on each of said vertical guide pins;
(d) a first slide plate having a plurality of first slideways received by said first horizontal grooves, respectively, so as to allow said first slide plate to slidably reciprocate on said vertical guide pins, said first slide plate being slidable in a direction parallel to said direction in which said cartridge is inserted into said slot;
(e) a second slide plate having a plurality of second slideways received by said second horizontal grooves, respectively, so as to allow said second slide plate to slidably reciprocate on said vertical guide pins, said second slide plate being slidable in a direction parallel to said direction in which said cartridge is inserted into said slot;
(f) a main driving wheel and a motor mounted on said first slide plate; said main driving wheel being engaged with said motor;
(g) an idle wheel mounted on said second slide plate; and
(h) a spring connecting between said first slide plate and said base plate;
(i) wherein said idle wheel, said main driving wheel, and said spring are positioned such that when said cartridge is inserted into said slot, said spring will be tensiled thus causing said main driving wheel to be in contact with said idle wheel, and said idle wheel in contact with a driving wheel provided in said cartridge, whereby a frictional force between said idle wheel and said driving wheel will cause a tape traveling therebetween to move as a result of a rotation by said main driving wheel.

2. The improved structure for use in a tape driving device as claimed in claim 1 wherein:

(a) said first slideways have a width that is greater than a depth of said first horizontal grooves but is smaller than a width of said vertical guide pins so as to allow said first slide plate to reciprocally slide along said first horizontal grooves; and (b) said second slideways have a width that is greater than a depth of said second horizontal grooves but is smaller than a width of said vertical guide pins so as to allow said second slide plate to reciprocally slide along said second horizontal grooves.

3. The improved structure for use in a tape driving device as claimed in claim 1 wherein said second slide plate has an "L" shape so as to facilitate a protrusion of said main driving wheel above a horizontal plane of said second slide plate.

4. The improved structure for use in a tape driving device as claimed in claim 1 wherein said first slide plate contains a plurality of first holes respectively adjacent said first slideways, said first holes have an opening greater than a width of said guide pins so as to allow said first slide plate to be slidably mounted into said guide pins; and said second slide plate contains a plurality of second holes respectively adjacent said second slideways, said second holes have an opening greater than said width of said guide pins so as to allow said second slide plate to be slidably mounted into said guide pins.

* * * * *